United States Patent

Niklas et al.

[11] Patent Number: 6,139,232
[45] Date of Patent: Oct. 31, 2000

[54] YZ- LATCH FOR TYING FREIGHT TO A LOADING FLOOR

[75] Inventors: Veronika Niklas, Hamburg; Hartmut Sempert, Hude, both of Germany; Torsten Eilts, Merville, France; Bernd Schernikau, Hamburg, Germany; Claus Voelker, Stuhr, Germany; Volker Eckert, Oldenburg, Germany; Bernhard Czisz, Bassum, Germany; Hans-Guenther Mix, Ganderkese, Germany

[73] Assignee: DaimlerChrysler Aerospace Airbus GmbH, Hamburg, Germany

[21] Appl. No.: 09/272,111

[22] Filed: Mar. 19, 1999

[30] Foreign Application Priority Data

Mar. 19, 1998 [DE] Germany .......................... 198 12 014

[51] Int. Cl.[7] .............................. B60P 1/64; B62B 25/00; B64C 1/22
[52] U.S. Cl. .................................. 410/80; 410/77; 410/92
[58] Field of Search .................................. 410/92, 77, 78, 410/80; 414/536; 244/118.1, 137.1; 193/35 R

[56] References Cited

U.S. PATENT DOCUMENTS

| 3,465,998 | 9/1969 | Ginn | 410/77 |
|---|---|---|---|
| 4,077,590 | 3/1978 | Shorey | 410/27 |
| 5,316,242 | 5/1994 | Eilenstein-Wiegmann et al. | 244/118.1 X |
| 5,356,250 | 10/1994 | Vogg et al. | |
| 5,564,654 | 10/1996 | Nordstrom | 410/77 X |
| 5,816,758 | 10/1998 | Huber | 410/92 X |

FOREIGN PATENT DOCUMENTS

| 3107745 | 9/1992 | Germany . |
|---|---|---|
| 4210703 | 10/1993 | Germany . |

Primary Examiner—D. Glenn Dayoan
Assistant Examiner—Scott Carpenter
Attorney, Agent, or Firm—W. F. Fasse; W. G. Fasse

[57] ABSTRACT

A YZ-latch for holding down a piece of freight on a loading floor in an aircraft which has a base holding an axle stub which in turn has mounted thereon two rollers for rolling contact with the freight piece. One roller holds against lateral displacement in the Y-direction. The other roller holds against vertical displacement in the Z-direction. Free movement is permitted in the X-direction. Either the axle stub with fixed rollers is rotatable, or the rollers are rotatable on the fixed axle stub, or at least one roller or both rollers are rotatable on a rotatable axle stub.

13 Claims, 3 Drawing Sheets

YZ- LATCH FOR TYING FREIGHT TO A LOADING FLOOR

PRIORITY CLAIM

This application is based on and claims the priority under 35 U.S.C. §119 of German Patent Application 198 12 014.1, filed on Mar. 19, 1998, the entire disclosure of which is incorporated herein by reference.

FIELD OF THE INVENTION

The invention relates to a latch that ties a piece of freight to a loading floor, particularly in an aircraft, thereby preventing movement in the Z-direction and in one lateral direction such as the Y-direction of a three-dimensional coordinate system. The latch permits free movement in the X-direction.

BACKGROUND INFORMATION

German Patent Publication DE 3,107,745 A1 (Hinrich et al.), published on Sep. 16, 1982 discloses a freight latch for installation in the loading floor of an aircraft, for example and so constructed that a piece of freight may roll over the latch in one direction. A spring loaded latching hook can be recessed into a frame below the upper surface of the loading floor or tilted out of the frame for engaging, for example a pallet.

German Patent DE 4,210,703 A1 (Vogg et al.), published on Oct. 14, 1993 and corresponding to U.S. Pat. No. 5,356,250, (Vogg et al.) issued on Oct. 18, 1994, discloses a latching mechanism that is adjustable in its position along the loading floor of an aircraft for retooling the floor either for passenger service or for freight service. The entire latching mechanism can also be recessed under the top surface of the floor and is operable by a foot pedal.

In order to make it possible for the above described latching devices to permit the movement of a piece of freight in the X-direction, a friction reducing layer or coating is provided on the latching hook. The friction reducing coating is for example a bronze alloy layer which is rather expensive and subject to wear and tear, because, due to the motion of a piece of freight in the X-direction, the sliding friction at the contact area between the piece of freight and latch is substantial and efforts to reduce this frictional wear increase maintenance costs. Such friction should be as small as possible in order to reduce the force required for moving a piece of freight into its loading position.

Conventional YZ-latches include in addition to the so-called Z-latch hook which is effective to hold down a freight piece in the vertical direction, a Y-stop member effective in the Y-direction. The Y-stop member is a roller installed directly in the Z-hook, see for example roller (25) in FIG. 1 of German Patent Publication 3,107,745 mentioned above. The friction reduction by a roller effective as a stop in the Y-direction in combination with a friction reducing layer on the Z-hook, leaves room for improvement, especially with regard to structural simplification and expenses, and with regard to further reducing friction particularly in the Z-direction.

OBJECTS OF THE INVENTION

In view of the foregoing it is the aim of the invention to achieve the following objects or in combination:

to provide a safe and reliable latching of a piece of freight in the Y- and Z-direction while simultaneously minimizing friction in both directions at reasonable costs;

to avoid the use of friction reducing coatings on such a freight latching device; and to construct the YZ-latch in such a way that roller friction rather than sliding friction is effective in the Y- and Z-directions so that displacement of a piece of freight in the X-direction is accomplished with a minimal driving force.

SUMMARY OF THE INVENTION

A YZ-latch for tying a piece of freight to a loading floor, for example in an aircraft, is characterized according to the invention by a base constructed for attachment to the loading floor. The base carries an axle stub to which the latch is secured for a rolling contact with the piece of freight in the Y- and Z-directions. The latch has a first roller section for restraining the piece of freight laterally in a Y-direction of a three-dimensional coordinate system and a second roller section for restraining the piece of freight vertically in a Z-direction. By providing rolling contacts between the freight piece and the latch in the Z- and Y-directions the piece of freight is freely movable in the X-direction on the loading floor while reliably assuring the intended restraining with a minimum of friction.

The rolling contact in the Y- and Z-direction is accomplished by two rollers formed as an integral single piece latch or as two separate rollers which is or are preferably attached in a rotatable manner to the axle stub which itself is fixed to the base. However, it is also possible to rotatably secure the axle stub to the base and fix the rollers to the axle stub or mount the axle stub and one or two rollers in a rotatable manner.

The main advantage of the invention is seen in that sliding frictional contact between the freight and the latch can be completely avoided. Another advantage resides in the fact that special surface coatings for reducing friction are no longer required.

BRIEF DESCRIPTION OF THE DRAWINGS

In order that the invention may be clearly understood it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
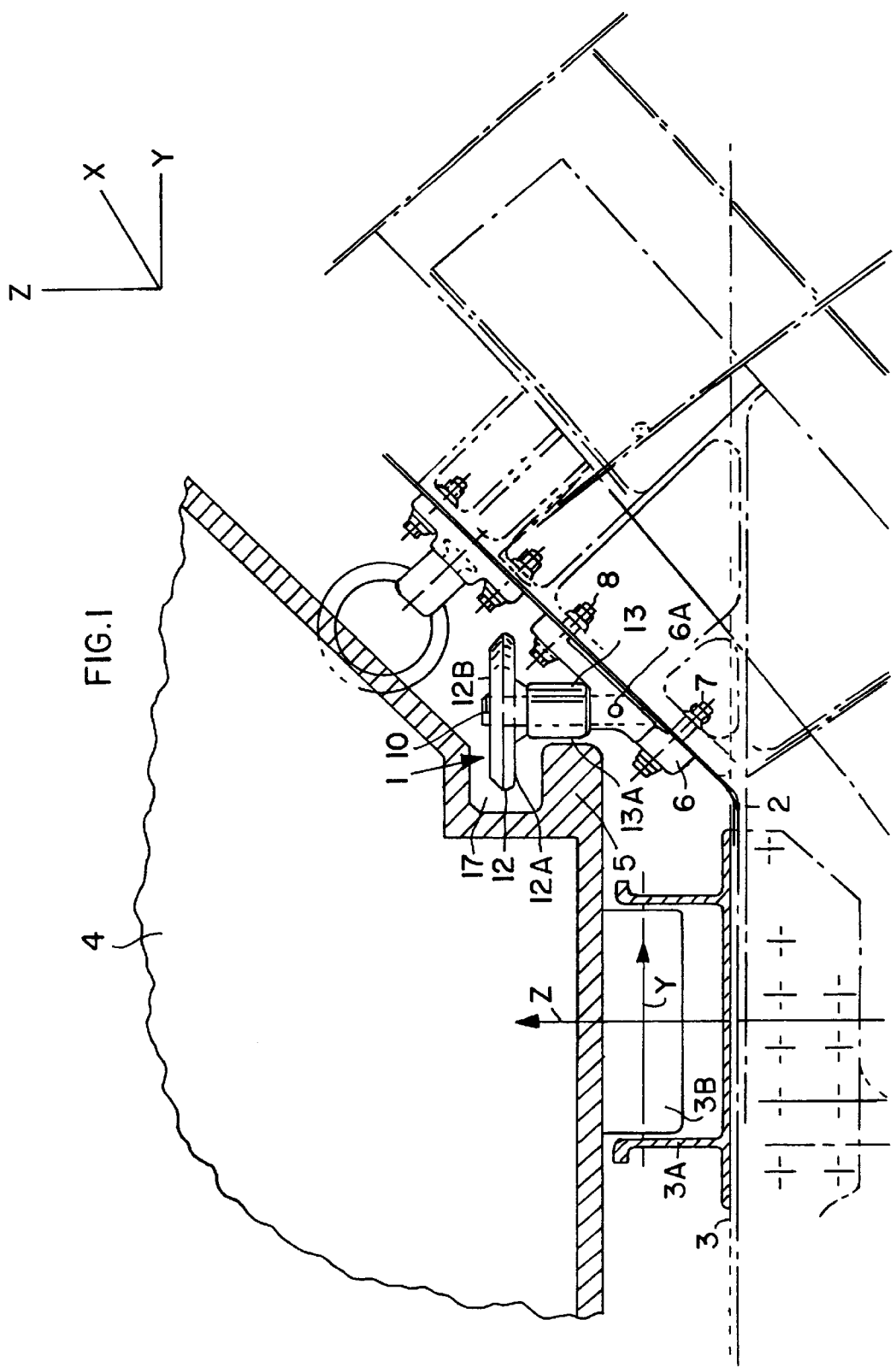
FIG. 1 is an elevational view of one embodiment of a latch according to the invention as seen in the direction of the longitudinal aircraft axis with a freight piece shown in section.

FIG. 1 shows a YZ-latch 1 mounted for rotation on an axle stub 10 that is secured in a base 6, which in turn is attached by screws 7 and 8 to a floor construction 2 forming a loading floor 3, for example in an aircraft. Rails 3A carrying rollers 3B permit freight pieces 4 to travel in the X-direction which corresponds to the longitudinal aircraft axis and extends perpendicularly to the plane of the drawing sheet. The freight piece 4 is provided with a projection 5 for contact with the latch in the lateral Y-direction and with a recess 17 for contacting the projection 5 in the vertical Z-direction as will be described in more detail below.

In the embodiment of FIG. 1, the axle stub 10 is secured against rotation in the base 6, for example by a cross-pin 6A.

The present YZ-latch 1 comprises two sections, namely a first roller section 13 rotatably mounted on the axle stub 10 and a second section in the form of a disk roller 12 also rotatably mounted to the axle stub 10. The first latch roller 13 provides a rolling contact surface or jacket 13A for contacting the projection 5 of the freight piece 4. This rolling contact 13A restrains the freight piece laterally against movement in the Y-direction.

The second latch section 12 in the form of a disk roller reaches into the recess 17 of the freight piece 4 and provides a contact surface 12A facing downwardly for providing a rolling contact with an upwardly facing surface of the projection 5. The roller disk 12 has an upwardly facing roller contact surface 12B that could contact a downwardly facing surface of the recess 17 for example when the freight piece has a tendency to tilt.

The rolling contact surfaces 12A and 13A are preferably provided with a crowning that will further reduce the contact area between the two rollers 13 and 12 which are preferably rotatable around the axle stub 10 independently of one another.

The two rollers 13 and 12 form with their cross-section a T-configuration. The circumferential edges of the relatively flat roller section 12 are preferably chamfered for an easy movement into the recess 17 in the lower edge of the freight piece 4. The roller contact areas 13A and 12A substantially eliminate any sliding friction that is present in conventional latches.

It is preferred that the roller sections 13 and 12 are constructed as two separate elements that can rotate independently of one another to avoid all sliding friction. However, it is possible to make the two roller sections 12 and 13 as one integral piece. In that case, however, the circumferential speeds at the contact area 13A and at the contact area 12A will differ from each other, whereby a certain minimal sliding motion may be encountered between the upwardly facing surface of the projection 5 and the downwardly facing surface 12A. Such minimal sliding friction can be further reduced by making the surface contact areas 13A and 12A slightly crowned to thereby reduce the contact surface area.

The slight crowning of the surface areas 13A and 12A may even be advantageous in the embodiment in which the rollers 12 and 13 are separately rotatable around the axle stub 10. In such an embodiment only roller friction takes place at the contact areas 13A and 12A. In all instances an easy movement of the freight piece 4 in the X-direction is assured requiring a smaller moving force than was necessary with conventional YZ-latches.

Figure 2:
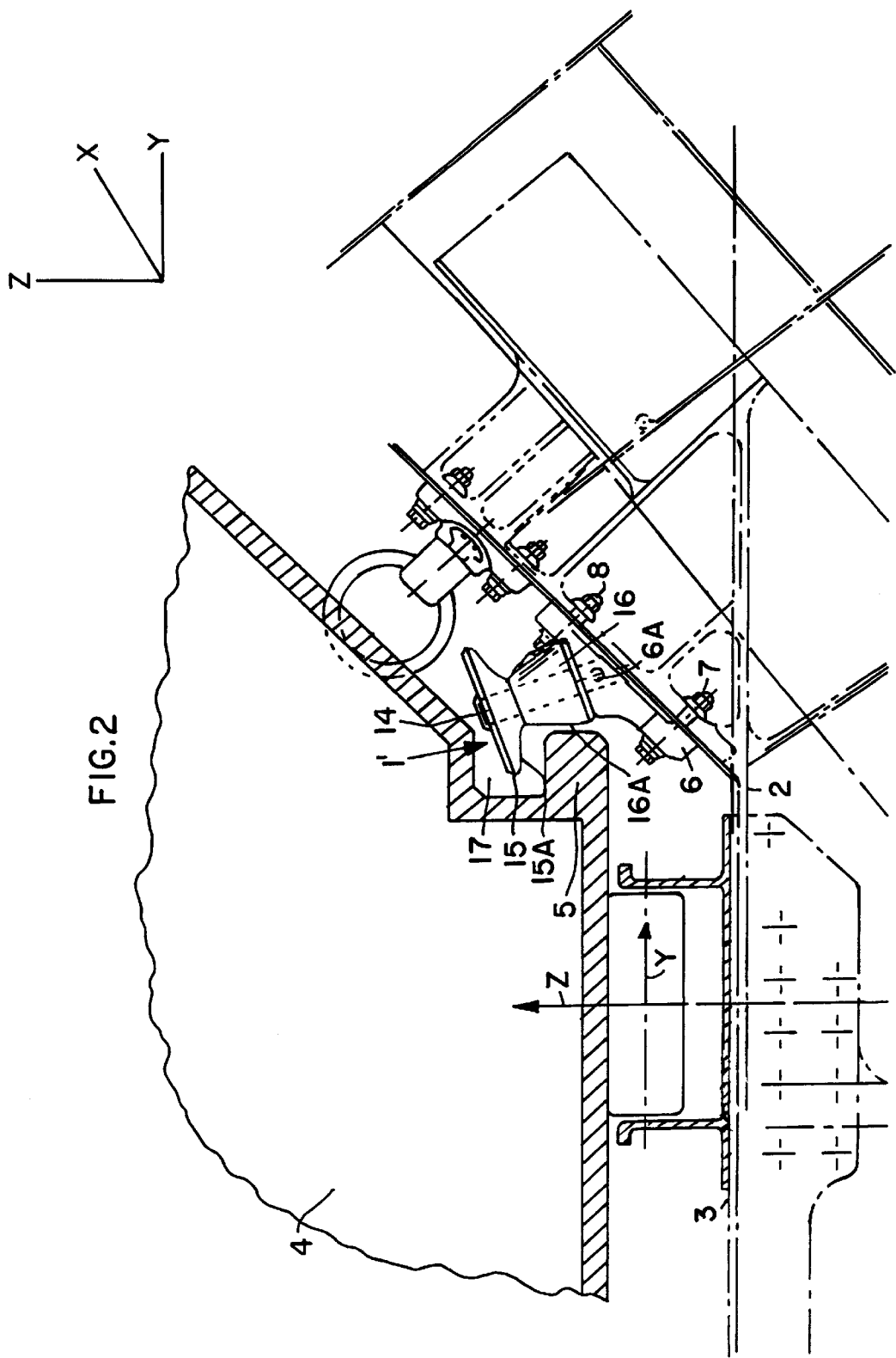
FIG. 2 is a view similar to that of FIG. 1, however showing a second embodiment of the YZ-latch according to the invention.

The embodiment of FIG. 2 is quite similar to that of FIG. 1, except that the latch 1' is rotatably mounted on an axle stub 14 that is positioned at an angle relative to the horizontal defined by the loading floor 3. The latch 1' also comprises two roller sections 16 and 15 each of which is constructed as a frustum conical roller, whereby the axial length of the roller section 16 is longer than the axial length of the frustum shaped conical disk roller 15 having a contact area 15A for restraining in the Z-direction while the contact surface area 16A restrains in the Y-direction. The surfaces 16A and 15A are preferably also slightly crowned for further reduction of friction. The rollers 15 and 16 may be a single integral piece or they may be two separate rollers as described above with reference to FIG. 1.

The angle of inclination of the axle stub 14 and the conicity of the rollers 15 and 16 are so selected that the contact surface 16A extends for cooperation with the respective counter surface of the projection 5, preferably substantially vertically. Similarly, the contact surface 15A will be directed substantially horizontally for contact with the upwardly facing surface of the projection 5. The slanting of the surface area 15A substantially facilitates the entrance of the disk roller section 15 into the recess 17. By making the surfaces 16A and 15A slightly crowned, the friction involved is substantially all roller friction, especially if the sections 15 and 16 can rotate independently of one another.

Figure 3:
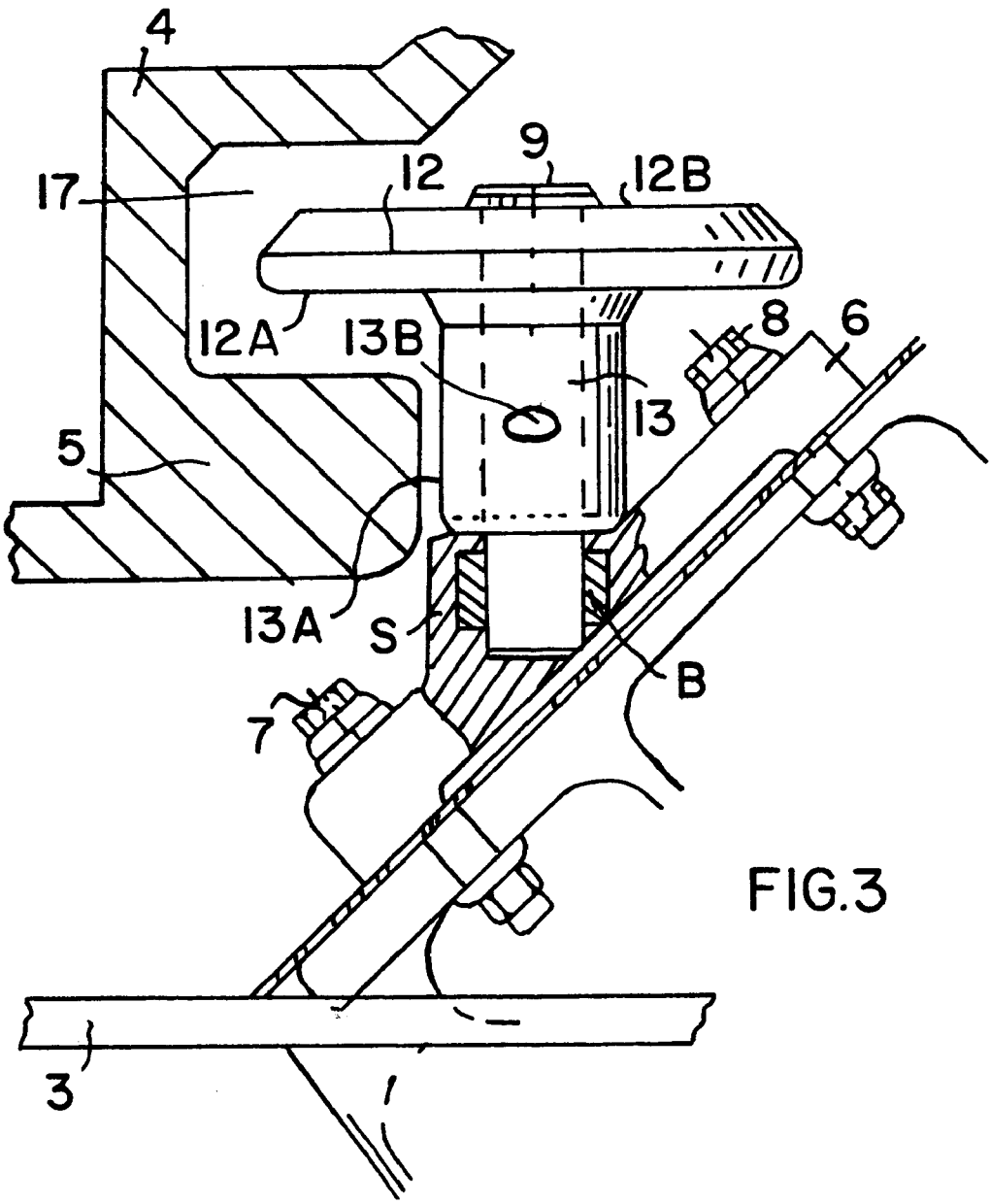
FIG. 3 shows on an enlarged scale a rotatably mounted axle stub for a YZ-latch according to the invention.

In FIG. 3, the rollers 12 and 13 are rigidly secured to the axle stub 9 which in turn is rotatably mounted in a socket S of the base 6, preferably with a bearing B which may be a slide bearing, a sleeve bearing, a roller bearing, or a ball-bearing. Otherwise, the construction is the same as described above. Even though the axle stub 9 is rotatable, one or both rollers could also be rotatable at the same time around the axle stub 9.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A YZ-latch for tying a freight piece (4) to a loading floor, said YZ-latch comprising a base (6) for attachment to said loading floor, an axle stub (9, 10, 14) operatively secured to said base (6), a latch (1) secured to said axle stub for rolling contact with said freight piece (4), said latch (1) comprising a first latch roller section (13, 16) for restraining said freight piece with a rolling contact laterally in a Y-direction of a three-dimensional coordinate system, and a second latch roller section (12, 15) for restraining said freight piece with a rolling contact vertically in a Z-direction of said three-dimensional coordinate system, and wherein said rolling contacts of said latch (1) with said freight piece permit free movement of said freight piece in an X-direction of said three-dimensional coordinate system on said loading floor, wherein said axle stub (10, 14) is rigidly mounted to said base (6), wherein said first latch roller section (13, 16) is rotatable mounted to said axle stub (10, 14), and wherein said second latch roller section is a disk (12, 15) also rotatably mounted to said axle stub.

2. The YZ-latch of claim 1, wherein said first latch roller section (13, 16) and said second latch roller section (12, 15) form said latch (1) as a single piece component that has a T-cross-sectional configuration.

3. The YZ-latch of claim 1, wherein said first latch roller section and said second latch roller section are two separate components having together a T-cross-sectional configuration.

4. The YZ-latch of claim 1, wherein said first and second latch roller sections comprise freight contact surfaces having a crowned configuration for said rolling contacts.

5. The YZ-latch of claim 1, wherein said first latch roller section (13) comprises a cylindrical shape having a surface providing said rolling contact for restraining said freight piece (4) in said lateral Y-direction, and wherein said second latch roller section comprises a disk (12) having a disk surface (12A) for projecting into a recess (17) of said freight piece (4) for said restraining in said vertical Z-direction.

6. The YZ-latch of claim 1, wherein said first latch roller section (16) comprises a conical frustum configuration having a conical contact surface (16A) providing said rolling contact for restraining said freight piece (4) in said lateral Y-direction, and wherein said second latch roller section comprises a conical frustum shaped disk (15) having a slanted disc surface (15A) for projecting into a recess (17) of said freight piece (4) for said restraining in said vertical Z-direction.

7. The YZ-latch of claim 1, wherein said second latch roller section (12, 15) is dimensioned for fitting into a recess (17) in said freight piece (4).

8. The YZ-latch of claim 1, wherein said axle stub has a central axis extending normal to said loading floor.

9. The YZ-latch of claim 8, wherein said first latch section is a cylindrical roller, and wherein said second latch section is a disk roller.

10. The YZ-latch of claim 1, wherein said axle stub has a central axis extending at an angle other than 90° to said loading floor.

11. The YZ-latch of claim 10 wherein said first latch section is a frustum conical roller and wherein said second latch section is a frustum-shaped conical disk.

12. A YZ-latch for tying a freight piece (4) to a loading floor, said YZ-latch comprising a base (6) for attachment to said loading floor, an axle stub (9, 10, 14 operatively secured to said base (6), a latch (1) secured to said axle stub-for rolling contact with said freight piece (4), said latch (1) comprising a first latch roller section (13, 16) for restraining said freight piece with a rolling contact laterally in a Y-direction of a three-dimensional coordinate system, and a second latch roller section (12, 15) for restraining said freight piece with a rolling contact vertically in a Z-direction of said three-dimensional coordinate system, and wherein said rolling contacts of said latch (1) with said freight piece permit free movement of said freight piece in an X-direction of said three-dimensional coordinate system on said loading floor, said YZ-latch further comprising a socket (S) in said base (6), at least one bearing (B) in said socket, wherein said axle stub (9) is rotatably mounted in said at least one bearing (B), wherein said first latch roller section is rigidly mounted to said rotatable axle stub (9), and wherein said second latch roller section is a roller disk operatively mounted to said rotatable axle stub.

13. The YZ-latch of claim 12, wherein said first latch roller section (16) comprises a conical frustum configuration having a conical contact surface (16A) providing said rolling contact for restraining said freight piece (4) in said lateral Y-direction, and wherein said second latch roller section comprises a conical frustum shaped disk (15) having a slanted disc surface (15A) for projecting into a recess (17) of said freight piece (4) for said restraining in said vertical Z-direction.

* * * * *